United States Patent [19]

Loudin

[11] Patent Number: 4,476,609

[45] Date of Patent: Oct. 16, 1984

[54] REUSABLE CASING AND CARRIER FOR USE IN PRODUCING SAUSAGE

[75] Inventor: Philip B. Loudin, Boulder, Colo.

[73] Assignee: Illinois Tool Works Inc., Chicago, Ill.

[21] Appl. No.: 430,434

[22] Filed: Sep. 30, 1982

[51] Int. Cl.³ .............................................. A22C 11/00
[52] U.S. Cl. .......................................... 17/1 R; 17/35; 17/49; 138/118.1; 428/36
[58] Field of Search ........................ 17/33, 49, 38, 1 F, 17/1 R; 206/802; 138/118.1; 428/36; 426/513, 523

[56] References Cited

U.S. PATENT DOCUMENTS

| 719,032 | 1/1903 | Napier | 17/33 |
|---|---|---|---|
| 1,009,953 | 11/1911 | Boyle | 426/513 |
| 3,916,483 | 11/1975 | Vinokur | 17/1 F |
| 4,280,803 | 7/1981 | Treharne | 426/513 |
| 4,371,554 | 2/1983 | Becker | 17/49 |

Primary Examiner—Nicholas P. Godici
Assistant Examiner—Kurt Rowan
Attorney, Agent, or Firm—Thomas W. Buckman; John P. O'Brien

[57] ABSTRACT

A reusable tubular casing for use in producing sausage comprises an elongate, tubular membrane; an elongate, tubular supporting layer in surrounding relation to the membrane through a substantial portion of its length; a rigid support structure supporting the membrane and said supporting layer to define a substantially smooth through bore extending from end to end of the elongate membrane. A carrier for releasably retaining the reusable casing comprises a supporting body, yokes for receiving and locating the casing relative to the body, and a force imposing structure impinging on the ends of the casing to maintain a predetermined force against sausage material carried within said casing.

6 Claims, 22 Drawing Figures

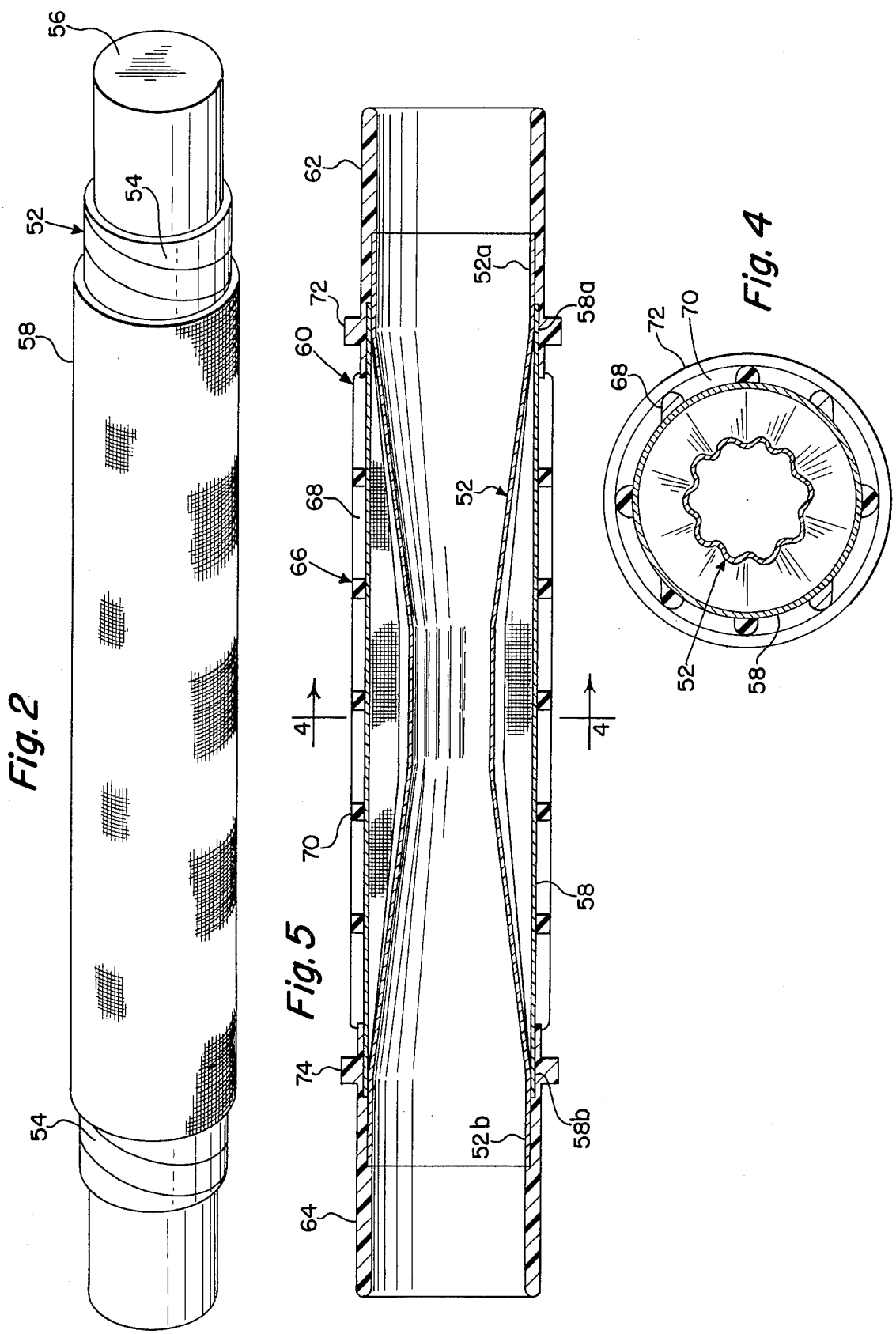

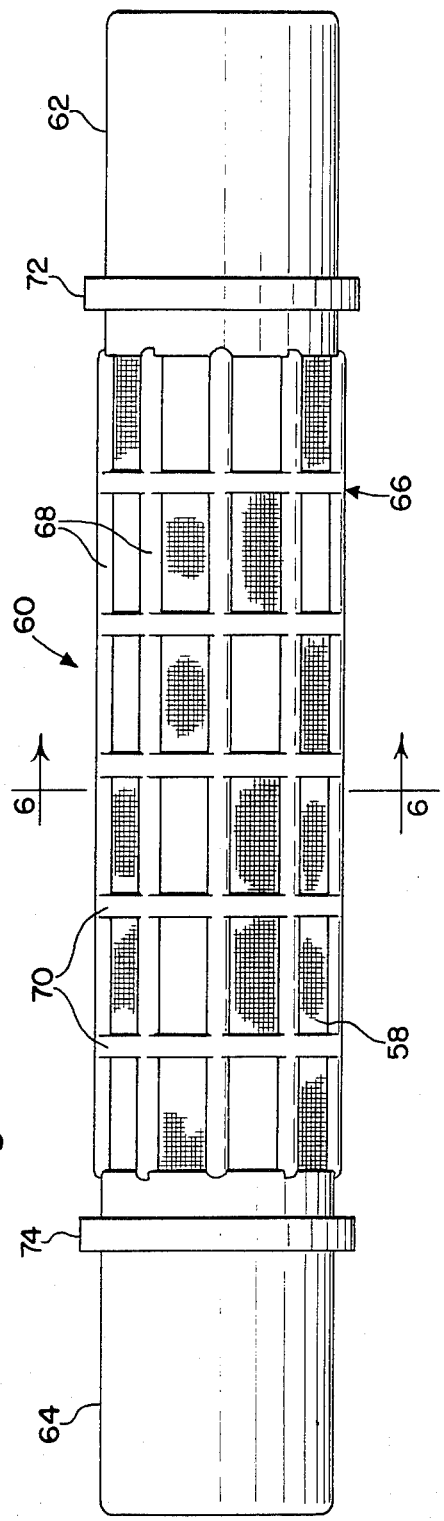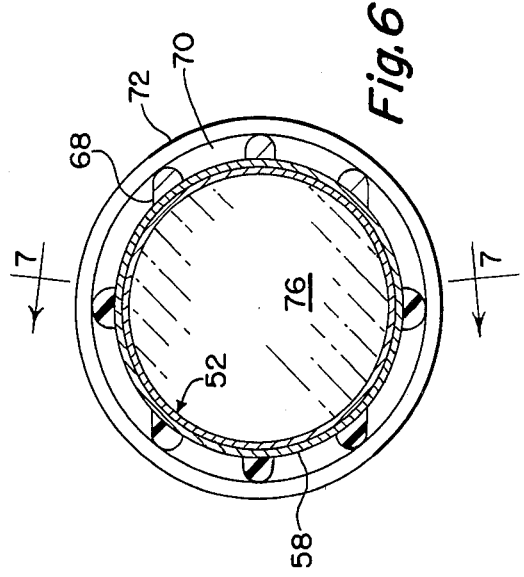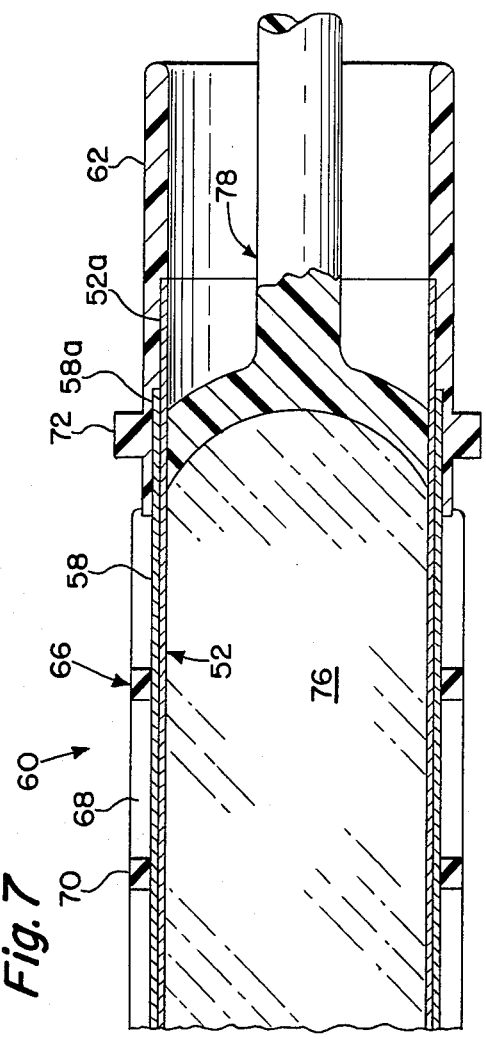

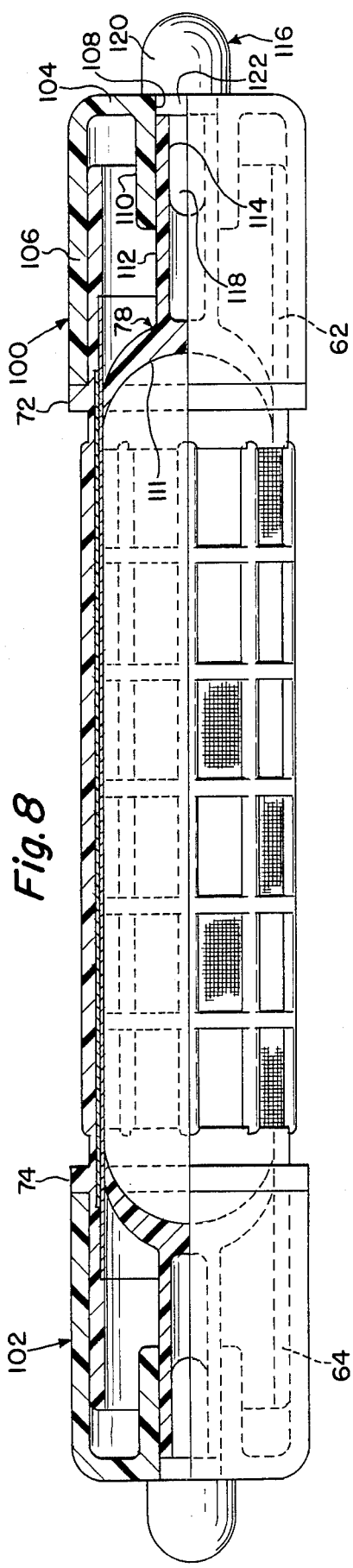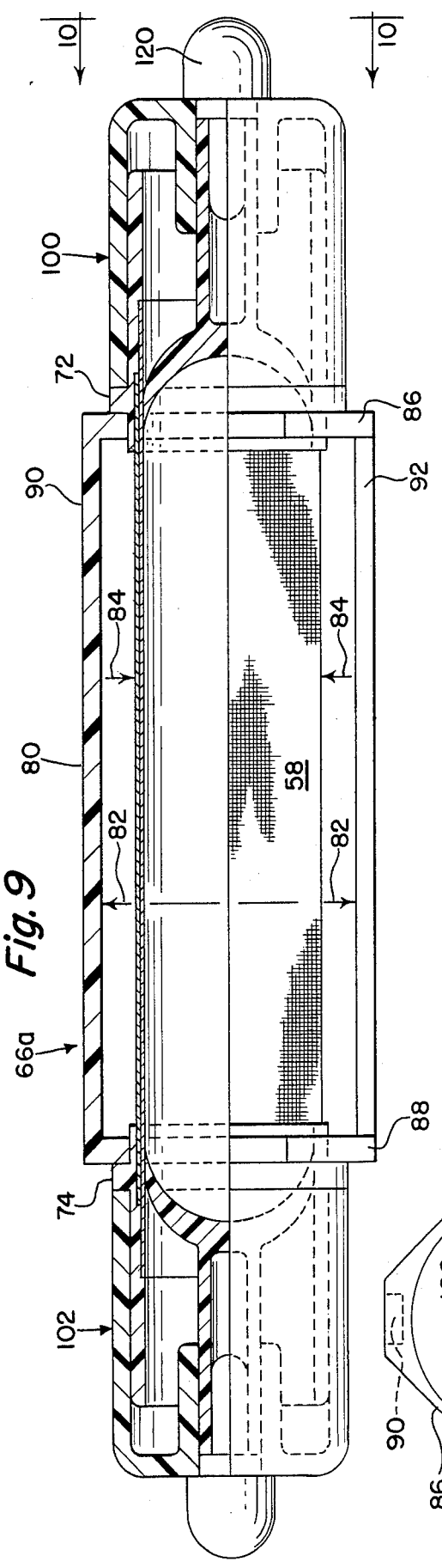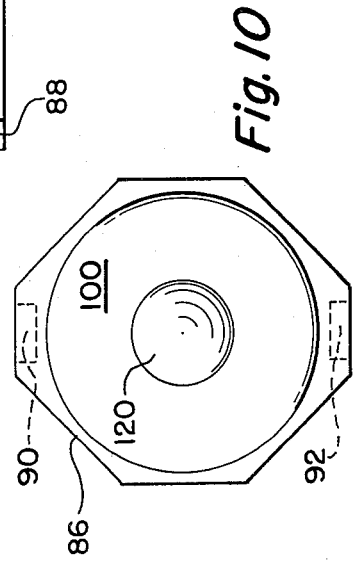

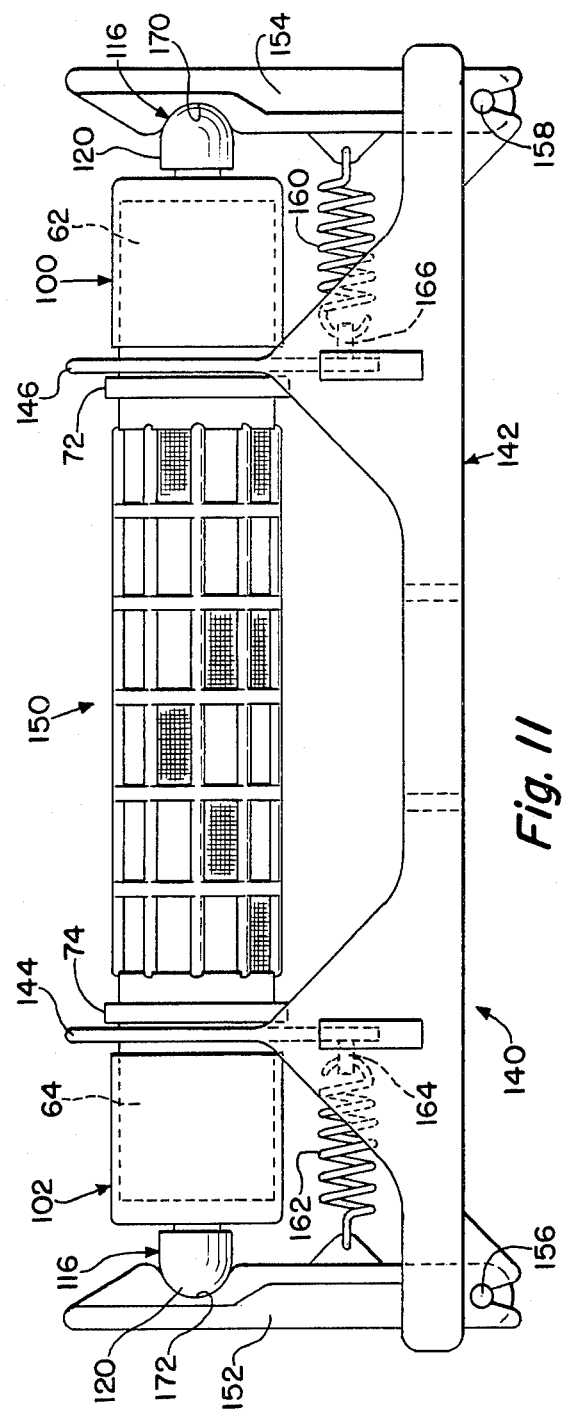
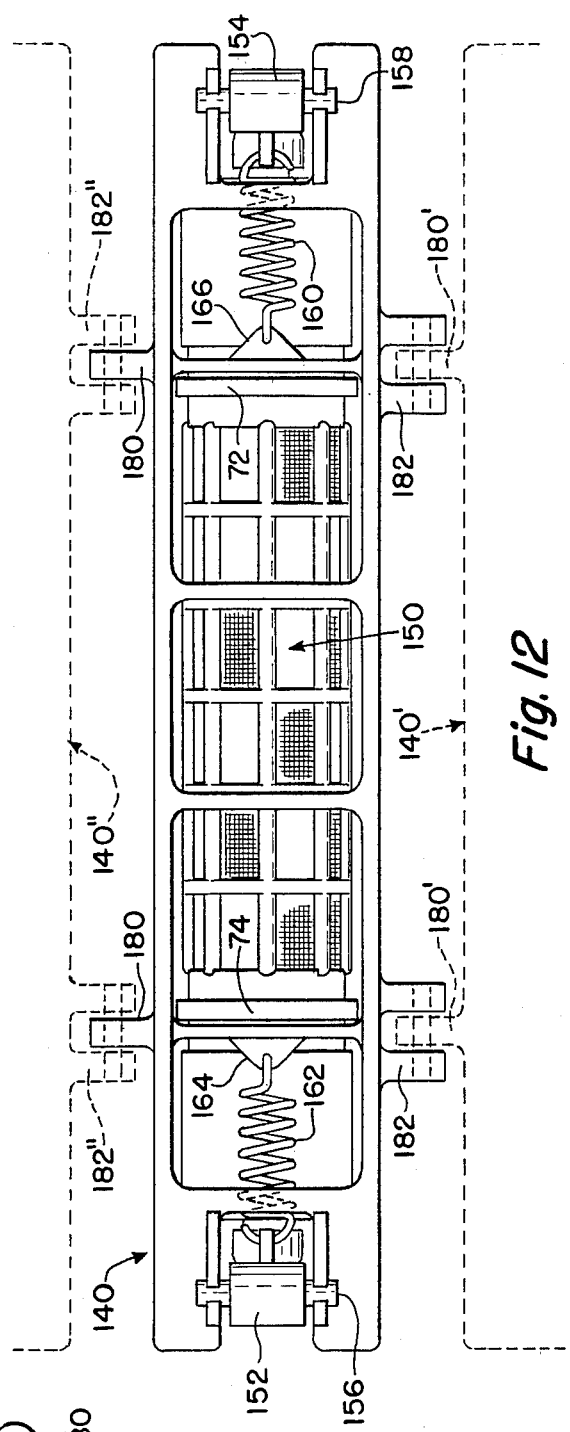
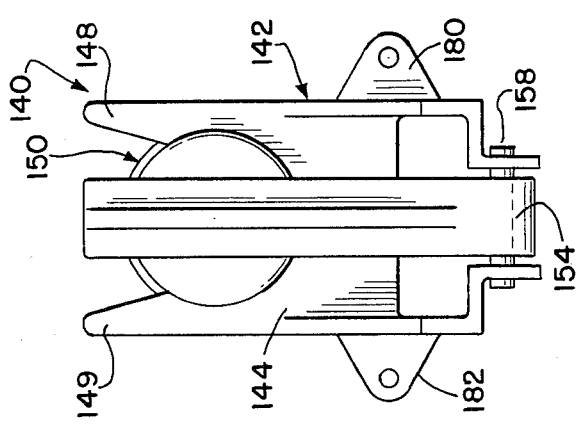

REUSABLE CASING AND CARRIER FOR USE IN PRODUCING SAUSAGE

BACKGROUND OF THE INVENTION

This invention relates generally to improved apparatus for the production of caseless (skinless) sausage, and more particularly to a reusable tubular casing and associated apparatus for this purpose.

In original sausage making procedures, bulk sausage was injected into a natural intestine casing and subsequently subjected to cooking and smoking procedures required for producing a particular type of sausage. Artificial casings made of various materials have also been utilized for quite some time. Most of the natural and artificial casings are inedible and hence must be removed before consumption. Accordingly, it has become the practice to peel the sausage casing during production. The casings are therefore not reusable, but are peeled and discarded prior to the completion of the production process.

Generally speaking, the process requires relatively expensive and specialized machinery as well as a considerable number of manual operations. For example, sausage stuffing is relatively automated utilizing grinders, cutters, emulsifiers and bonders to batch the material, and fill the casings. However, some sausages, particularly large diameter types are still hand or manually filled into the casings.

Generally speaking, the casing material is used as a vehicle for holding the relatively soft and unstable sausage material during initial smoking and/or cooking or other heat treating steps. Thereafter, the smoked and/or cooked casing-enclosed material is water showered and chilled, stabilizing the consistency and shape of the sausage. Thereafter, the stabilized links are generally hand-fed into a peeler for removal of the casing material prior to any further processing. The manual labor involved in the peeling of casing, in addition to being relatively expensive, also accounts for the largest percentage of breakage, spoilage, etc. of the sausages. This is so, in part, because it is impossible to precisely adjust the cutting portions of the peeling machines to avoid frequent cutting into the surfaces of the sausages. Hence, a relatively high precentage of sausages are scored or cut, resulting in bursting when the sausage is thereafter heated, whereupon the sausage must be discarded. Additionally, following the removal of the casing material, the material is no longer usable and is discarded. Hence, a relatively large amount of casing material is required at a significant expense in the production of large quantities of sausage.

In an effort to avoid many of the foregoing problems, a number of processes and related apparatus have been developed for production of so-called caseless or skinless sausages. These processes generally employ an apparatus provided with a plurality of molds which receive the sausage material for the initial forming and cooking steps of the procedure. Thereafter, the formed and cooked sausage is removed from the molds whereupon the molds may be cleaned for reuse. Hence, the molds are generally carried on a suitable conveyor mechanism through various stations in a mechanized process including a fill station, a boiling or cooking oven, a cooling station and a mold removal station.

However, the foregoing mold structures have generally left much room for improvement. For example, during the heating and cooking of the bulk sausage material, a quantity of water vapor, steam and other volatile substances are released from the material and provision must be made for their release from the mold as well. Additionally, the inner surface of the mold must readily and rapidly release the sausage material substantially without sticking when the heating and cooling process is completed. Moreover, the pressure created during heating due to the expansion of the bulk sausage material can prevent vapor and other volatile substances released during cooking from reaching exits provided in the casings or molds. Also, this expansion of the bulk sausage material often results in discontinuities of the pressure applied throughout the material, which results in undesirable discontinuities in the density of the completed sausage.

Briefly, then, reusable casings for the production of a caseless sausage must meet the following requirements:

1. The casing must be sufficiently permeable for release of water vapor steam and other volatile components released during cooking.

2. The casing must not release any constituents injurious to health or adversely affect the taste, smell or appearance of the sausage. In this latter regard, pores provided in the above-mentioned molding apparatus often produce undesirable markings on the surfaces of the completed sausage.

3. The pores of the casing must be relatively resistant to being plugged with fat or the like released during cooking so that the permeability of the casing is not decreased.

4. The casing must be adapted to be relatively simply and rapidly cleaned between uses.

5. The casing must be resistant to damage from the pressures, temperatures, etc., encountered during cooking, and remain mechanically stable and pliant through a relatively large number of uses.

6. The internal surfaces of the casing must neither adhere to the sausage material nor cause disfiguration or discontinuities of the external surface of the finished sausage, which should have a smooth, unbroken appearance.

OBJECTS AND SUMMARY OF THE INVENTION

Accordingly it is a general object of the invention to provide a reusable casing and apparatus for producing caseless sausage which substantially avoids the problems of the prior art.

A more specific object is to provide such a casing and apparatus which substantially meets all of the foregoing requirements.

A related object is to provide such a casing and apparatus which is relatively simple and inexpensive both in its manufacture and in use, and yet is highly reliable over a long service life and multiple reuses.

Briefly, and in accordance with the foregoing objects, the invention provides a novel reusable casing and a novel carrier for releasably retaining said casing.

In accordance with one aspect of the invention, a reusable casing comprises an elongate, tubular, vapor-permeable porous membrane; an elongate, tubular porous supporting layer in surrounding relation to said membrane throughout a substantial portion of its length and a rigid supporting structure for supporting at least the axially outer ends of said membrane and said supporting layer so as to define a smooth bore extending substantially from one end of said casing to the other end of said casing.

In accordance with another aspect of the invention, a carrier for releasably retaining a reusable casing comprising an elongate tubular member and a pair of end caps slidably supporting axially movable piston means disposed within the ends of said tubular member comprises supporting body means, yoke means for supporting and locating said casing member relative to said body, and force imposing means for impinging upon said piston means to maintain a predetermined force against sausage material carried within said casing tubular member.

BRIEF DESCRIPTOIN OF THE DRAWINGS

The foregoing, as well as other objects, features and advantages of the invention will become more readily apparent upon reference to the following detailed description of the illustrated embodiments, together with reference to the drawings wherein:

FIG. 2 is a side elevation of a partially assembled reusable casing in accordance with a preferred form of the invention;

FIG. 3 is a side elevation of a fully assembled reusable casing structure in accordance with one form of the invention;

FIG. 4 is an enlarged cross-section taken generally along the line 4—4 of FIG. 3;

FIG. 5 is a longitudinal section through the casing of FIG. 3;

FIG. 6 is an enlarged section similar to FIG. 4 illustrating the reusable casing of the invention filled with sausage material;

FIG. 7 is an enlarged longitudinal section, similar to FIG. 5, taken along line 7—7 of FIG. 6, illustrating a plunger or piston member in operative relation with the reusable casing of FIGS. 2 through 6;

FIG. 8 is a side elevation, partially in section, of the reusable casing of FIGS. 2 through 6, further assembled with end caps in accordance with a preferred form of the invention;

FIG. 9 is a side elevation, partially in section, similar to FIG. 8 illustrating an assembled casing and end caps in accordance with an alternate embodiment of the invention;

FIG. 10 is an end view of the assembly of FIG. 9, taken generally in the plane of the line 10—10;

FIG. 11 is a side elevation showing the assembly of FIG. 8 further mounted upon a novel carrier in accordance with another aspect of the invention;

FIG. 12 is a bottom view of the assembly of FIG. 11;

FIG. 13 is an end view of the assembly of FIG. 11; and

DETAILED DESCRIPTION OF THE ILLUSTRATED EMBODIMENT

Figure 1:
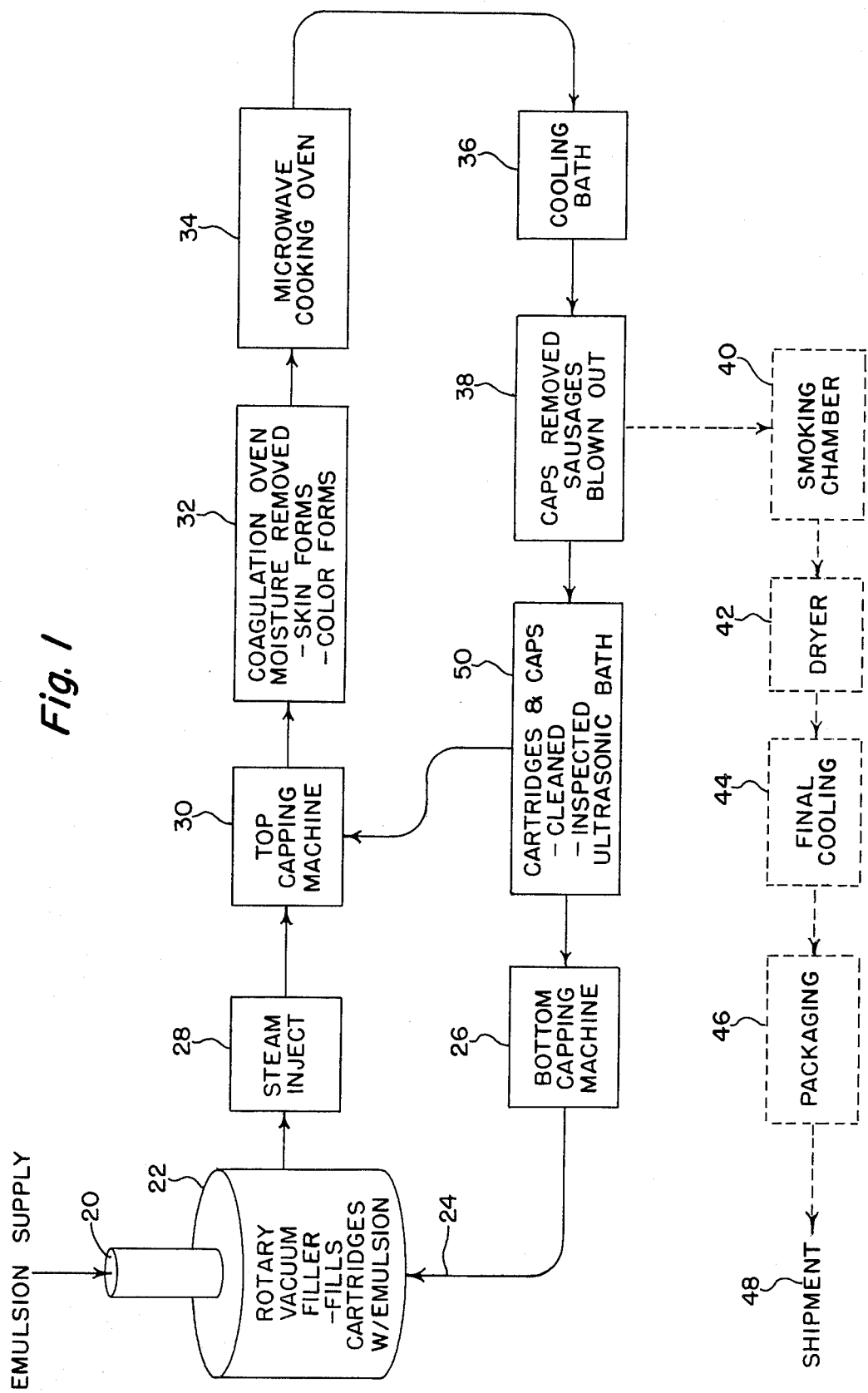
FIG. 1 is a flow chart illustrating a sausage production process in which the apparatus of the invention may be advantageously utilized.

Referring now to the drawings and initially to FIG. 1, there is shown a preferred sausage production process in conjunction with which the apparatus of the invention may be advantageously utilized. It will be understood, however, that the invention may find other utility, the use thereof not being limited to the illustra process. Rather, this process is illustrated for purposes of facilitating the understanding of the invention to be hereinafter described.

In the prior art, machines were utilized to fill casings with bulk sausage material. The filled casings were then lined up on a spit and one after another subjected in smoking chambers to generally the following sequence of operations: coagulating and reddening, drying, smoking, cooking or parboiling and cooling. After leaving the smoking chambers, the sausage casings were then generally removed by peeling machines in order to produce skinless or caseless sausages. This latter process requires a relatively large amount of manual labor.

In utilizing the reusable casing and apparatus according to the invention, the foregoing process may be economically modified somewhat. In this regard, it is considered desirable to minimize the period of time during which the sausage remains in the casing. Accordingly, the smoking portion of the process may be delayed until the end of the sequence, and carried out after the shaped, coagulated and cooled sausage is ejected from the reusable casing apparatus. In this regard, it will be recognized that the reddening and coagulating steps provide a thin integral skin on the sausage and enables the sausage to be handled without the casing. However, the release of water vapor, steam and other volatile or gaseous constituents must take place while the sausage is supported by the casing. In this regard, it has also been found that microwave heating is useful for shortening the time required for reddening and coagulation steps.

Accordingly, and now referring more particularly to FIG. 1, it will be seen that the production of sausage in accordance with the invention generally takes place in accordance with the following steps.

Initially, a supply of raw bulk sausage, preferably in emulsion form is provided at an inlet 20 of a rotary vacuum filler machine 22 which receives a supply of reusable casings or cartridges in accordance with the invention at a second inlet 24 thereof.

As will be more fully described later herein, these reusable casings or cartridges generally speaking, comprise a tubular body portion and top and bottom end cap portions. Accordingly, the inlet 24 of the cartridge or casing filling machine 22 is provided with a supply of cartridges or casings with a bottom cap pre-applied thereto by a suitable bottom capping machine 26.

The rotary vacuum filler 22 then fills each cartridge or reusable casing with the raw bulk sausage emulsion, whereupon the filled casing is delivered to a steam injecting stage 28 for initial treatment. Thereafter, the cartridge or casing with the steam treated filling is fed to a suitable top capping machine 30 to have the top cap applied thereto. The now assembled and capped casing containing the sausage material is then delivered to a coagulation oven 32 wherein moisture and other vapor and gaseous constituents are removed by heating, and wherein some initial skin formation or shaping and color or reddening take place. Immediately thereafter the shaped or coagulated and reddened sausage is fed to a microwave cooking oven for completion of the reddening and coagulation and the desired amount of precooking.

From the microwave cooking oven 34 the cartridges or casings are fed to a suitable cooling bath 36. Thereafter, both end caps are removed from the cartridge or reusable casing and the coagulated reddened and precooked sausages are removed, preferably by the application of an air blast to one end of the tubular casing member, as indicated at 38. Thereafter, the sausages are further processed, as indicated in dash line, for example by smoking in a smoking chamber 40 (if desired) suitable drying in a dryer 42, final cooling as shown at 44 and packaging and shipment as indicated at 46, 48. At the same time the used cartridges and caps are fed to a suitable cleaning and inspection station as indicated generally at 50, where they are preferably cleaned in ultrasonic bath and inspected. Thereafter, the cartridge or casing tubular bodies and bottom caps are fed to the bottom capping machine 26 for further use while the remaining top caps are fed to the top capping machine 30 for reuse.

Referring now to FIGS. 2 through 6, inclusive, the reusable casing in accordance with the invention will be best understood with reference to the method of construction thereof. Referring initially to FIG. 2, a reusable membrane 52 comprises an elongate tubular and preferably cylindrical, open ended body. In accordance with a preferred form of the invention, this tubular membrane 52 is preferably formed from an elongate filament 54 of a polytetrafluoroethylene (PTFE) wound in a helical fashion to form the generally cylindrical, open ended tube 52.

It has been found that the PTFE material may be formed in relatively small fibril lengths to yeild effective pore sizes no more than 1.0 micrometers, preferably no more than 0.5 micrometers and optimally no more than 0.2 micrometers. It is preferred that the membrane having a nominal thickness of 0.01 to 5 millimeters and a nominal porosity of 30 to 99 and preferably 55 to 85 percent. Membranes of this type, their characteristics and production are shown for example in U.S. Pat. Nos. 3,953,566 and 3,962,153 and need not be described in further detail.

This PTFE membrane 52 has sufficient porosity to permit venting radially through the casing of steam, water vapor, and other volatile or gaseous constituents released during the processing of the sausage material present within the casing. The surface texture of this membrane 52 is also suitable for readily releasing the processed sausage material while maintaining the integrity of the sausage surface and the sausage as a whole. Moreover, the microstructure of this material, comprising PTFE nodes connected by PTFE fibrils of lengths as mentioned above limits the extrusion of solid or liquid sausage material through the membrane during filling of the casing. This preserves the desired high degree of porosity of the casing and results in low adhesion between the sausage material and casing inner wall.

The foregoing characteristics of the PTFE material forming the tubular casing 52 are generally known in the art and need not be described further herein. Suitable characteristics of the membrane 52 are further set forth, for example, in published British specification GB No. 2,066,037A.

In accordance with the invention, the tubular membrane 52 is placed upon a core 56 of a molding apparatus (not shown). Thereafter, a tubular supporting layer 58 is placed in surrounding engagement with the tubular membrane 52 over the mold core 56.

In accordance with a preferred form of the invention, this tubular support layer 58 preferably comprises a woven monofilament fabric formed into a seamless tubular weave. Preferably, this monofilament material comprises a polyester yarn, however, it is believed that nylon may also be utilized. It is believed further that during manufacture this yarn is stretched in such a way that later application of heat causes some shrinkage in the fashion of "shrink tubing" used in electronics to ensure surrounding supportive engagement of the support tube 58 with the tubular membrane 52 as illustrated in FIG. 2. Preferably, the weave of the fabric forming the tube 58 leaves openings or interstices of on the order of 30 microns to 100 microns. This configuration is believed to substantially avoid "resin penetration" during the molding process to be hereinafter described, thus maintaining the desired porosity of the support layer 58.

Referring now also to FIGS. 3 through 6, the structure illustrated in FIG. 2 is placed in a suitable mold cavity (not shown) whereupon the tubular membrane 52 and surrounding tubular support layer 58 are insert molded into a rigid support structure designated generally by the reference numeral 60. In this regard, the molded rigid support structure 60 comprises a general tubular member having a pair of similar tubular end portions 62, 64 and a frame-like tubular intermediate portion 66 in surrounding relation to the tubular support layer 58 and axially joining the axially facing ends of the opposing end portions 62 and 64.

In accordance with the embodiment illustrated in FIGS. 3 through 6, the tubular end portions 62 and 64 and frame like tubular central portion 66 are integrally formed in a single insert molding process. By this it is meant that the tubular membrane 52 and tubular support layer 58 illustrated in FIG. 2 are inserted into the mold cavity (not shown) whereupon the end portions 62 and 64 are molded into intimate contact with axially outer ends thereof, while the major portions of the intermediate axial lengths thereof are left free of the support structure 60 and in particular the intermediate frame-like portion 66 thereof. Accordingly, and as illustrated in FIGS. 4 and 5, the tubular membrane 52 is free to collapse radially inwardly in response to a vacuum applied thereto for cleaning purposes, for example as illustrated at reference numeral 50 in FIG. 1.

It will no noted that the axial length of the tubular casing 52 is somewhat greater than the axial length of the tubular support layer 58, and the latter is substantially centered with respect to the axial length of the former. Accordingly, the axially outer ends 52a, 52b of the tubular membrane 52 extend somewhat further into and are in intimate molded engagement with the interiors of the respective tubular end portions 62 and 64 of the rigid support structure 60. In this regard, it will be seen in FIG. 5 that the axially outer end portions 58a, 58b of the tubular support layer 58 are molded into engagement with the interior surfaces of the respective end portions 62 and 64 at portions thereof immediately radially outwardly and axially inwardly of the similarly engaged surfaces 52a and 52b of the tubular membrane 52.

Referring now also to FIGS. 3 and 4, the structure of the frame-like tubular intermediate portion 66 of the rigid support structure 60 is illustrated in greater detail. Briefly, this frame-like portion 66 comprises a plurality of axially extending ribs 68 which extend substantially integrally between facing or opposing axially inner end surfaces of the end portions 62 and 64. Additionally, a plurality of circumferentially extending generally circular rib members 70 are axially spaced along the length of these axially extending ribs 68 and are integrally formed therewith to form a grid or matrix-like tubular frame structure 66. Preferably, the end portions 62 and 64 of the rigid support structure 60 are further provided with an additional annular, circumferential radially outwardly extending ribs 72 and 74 for use in engaging the completed cartridge or reusable casing structure with end caps and with a carrier structure as will be seen later.

Referring briefly to FIG. 6, it will be seen that the membrane 58 expands so as to be surroundingly engaged and supported by the tubular support layer 58 when filled with sausage material 76. Additionally, as seen in FIG. 7, a suitable plunger or piston member 78 to be more fully described later is provided for holding the sausage material 76 within the reusable casing or cartridge structure in accordance with the invention. A similar piston or plunger 78 is used at each end of the tubular cartridge, only one end thereof being illustrated in FIG. 7 for facilitating the description. Moreover, in accordance with the embodiment thus far illustrated and described it will be seen that the support rib members 68 and 70 of the rigid support structure 60 provide further support to the support layer 58 without substantially comprising the porous features thereof in operation.

Referring next to FIGS. 8 through 10 inclusive, further details of the plunger or piston member 78 and the end caps mentioned above are illustrated. Additionally, FIGS. 9 and 10 illustrate an alternative embodiment of the intermediate frame-like portion 66 of the support structure 60. In this regard, in this alternate embodiment, the intermediate support structure portion 66 is here designated as 66a and comprises a frame-like or tubular member 80 which defines an inner diameter 82 which is greater than the outer diameter 84 of the tubular support layer 58. Hence, the frame-like member 80 is substantially evenly radially spaced from and does not contact any portion of the tubular support member 58.

In this embodiment illustrated in FIGS. 9 and 10 this frame member 80 is preferably provided as a separate piece from the molded end portions 62 and 64 of the rigid support structure. In this regard, the alternate embodiment contemplates insert molding the tubular membrane 52 and tubular support layer or sleeve 58 with the support structure end portions 62 and 64, absent the intermediate portion 66 in the same fashion illustrated and described above with reference to FIGS. 2 through 6. Thereafter, the intermediate portion 66a of the support structure illustrated in FIGS. 9 and 10 may be formed separately and then assembled with the end portions 62 and 64 as illustrated in FIGS. 9 and 10.

In this regard, it will be seen that this latter frame-like portion 66a functions as a "separation frame" in that it includes generally hollow, polygonal, frame-like end portions or members 86, 88 which surroundingly engage respective axially facing ends of the respective end portions 62 and 64 and abut facing surfaces of the annular ribs 72, 74. Integrally formed axially extending bars or ribs 90 and 92 interconnect these generally annular end members 86 and 88. Alternative structures may be utilized for this separation frame member 66a without departing from the invention, so long as the intermediate portion thereof is configured to avoid contact with the tubular support mesh 58, while axially positioning and joining the respective end portions 62 and 64 as illustrated in FIG. 9.

In accordance with a preferred form of the invention, substantially identical end cap structures designated generally by the reference numerals 100 and 102 are provided for both the embodiment of FIG. 8 and the embodiment of FIGS. 9 and 10, whereby only one such end cap 100 will be described in detail. Referring to FIG. 8, this end cap 100 comprises a generally circular centrally apertured base portion 104 with an annular and preferably cylindrical depending skirt 106 which is shaped to releasably surroundingly engage the end portion 62 of the support structure. The central aperture 108 of the base portion 104 is further provided with a generally annular and preferably cylindrical inwardly extending sleeve portion 110 which is generally coaxially formed with the annular skirt 106. This sleeve portion 110 receives a complementary shaped axially extending rod or stem portion of the plunger or piston member 78 briefly referred to above in the description of FIG. 7. In accordance with a preferred form of the invention, the rod or stem portion 112 is axially slidably movable with respect to the sleeve 110.

Additionally, the rod or stem portion 112 preferably carries a central bore 114 which is shaped to accept an end plug member 116. In the illustrated embodiment, this end plug member 116 generally comprises a pin portion 118 which is shaped to engage the bore 114 in a press fit and an enlarged head portion 120 which is adapted to overlie the periphery of the through aperture 108 of the end cap 100. Additionally, a shoulder portion 122 is provided intermediate the pin portion 118 and head portion 120. This shoulder portion 122 is preferably of similar diameter to the outer diameter of the rod or stem portion 118 so as to slidably engage the aperture 108 of the end cap 100. The plungers or pistons 78 are provided with suitable axially inwardly facing bearing surfaces 111 which are arcuately or concavely shaped generally as desired to form the axially outer ends of the sausage.

In operation, and referring now to FIGS. 11 through 13, inclusive, the reusable casing or cartridge structure thus far described is adapted to be releasably retained in a carrier structure designated generally by the reference numeral 140. This carrier structure 140 comprises a supporting body or base member designated generally by the reference numeral 142 which mounts a pair of laterally extending yokes 144, 146. Yokes 144, 146 receive and engage the reusable casing or cartridge in accordance with FIGS. 2 through 8 which is here generally designated by the reference numeral 150.

In the illustrated embodiment, each of these yokes 144 and 146 comprises a pair of arms or extensions 148, 149 (see FIG. 13). Arms 148, 149 are preferably shaped to resiliently snappingly engage about the cylindrical periphery of the respective end portions 62, 64 of the support structure 60 axially intermediate the annular rings 72 and 74 thereof and the axially inner faces of the respective end caps 100, 102. Moreover, the respective yokes 144 and 146 hold the cartridge or casing assembly 150 substantially centered with respect to the base or body member 142 of the carrier assembly Additionally, the carrier assembly 140 includes a suitable force imposing or pressing structure for bearing against the respective axially outer ends of the plug members 120. In this regard, it will be recognized that application of force or pressure against these plug ends 120 results in such force or pressure being transmitted by means of the shoulders 122 thereof to the respective rod or stem portions 112 of the plungers or pistons 78.

These bearing or force-applying means preferably apply a substantially constant force or pressure to the respective plungers or pistons 78. Hence, the bearing surfaces 111 thereof in turn apply constant force or pressure to pistons 78 for substantially maintaining the pressure applied to the sausage material during coagulation and formation thereof. Advantageously, this substantially avoids problems encountered in the prior art of irregularities in the texture or consistency of the sausage due to a lack of provision for the maintenance of substantially constant pressure thereof while expanding during cooking.

In the illustrated embodiment, this force-applying or pressure-maintaining structure generally comprises a pair of laterally outwardly extending arms 152, 154 which are substantially evenly spaced axially outwardly of the respective yokes 144 and 146. These arms 152 and 154 are pivotally mounted to respective axially outer ends of the carrier base or body 140 as indicated generally at reference numerals 156 and 158. Additionally, suitable resilient urging means in the form of tension springs 160 and 162 are coupled intermediate these pivotally mounted arms 152 and 154 and suitable ears or tabs 164, 166 provided therefor on the base or body 140. It will be seen that the respective springs 160 and 162 are mounted so as to exert a moment about the respective pivot points 156 and 158 thus fulcruming the free outer end portions of the respective arms 152 and 154 into engagement with the respective heads 120 of the plug caps 116. Preferably, the pivoted arms 150 and 152 at their free ends include suitable cam lead-in surfaces and intermediately positioned detent recesses 170, 172 for releasably surroundingly engaging the outer surfaces of the head portions 120 of the respective end plugs 116. In this regard the shape of these cam lead-in surfaces and detent recesses 170, 172 are preferably complementary-shaped to receive the outer surfaces of the respective plug heads 120.

In accordance with a preferred form of the invention and referring to FIGS. 12 and 13, additional connectors, or connecting means 180, 182 are provided on the carrier 140. These connectors 180, 182 releasably engage complementary connecting means on substantially identical carriers so as to interconnect a plurality of such carriers in a conveyor-like structure for carrying a plurality of similar reusable casings or cartridge structures 150 throughout a plurality of processing stations as generally illustrated and described above with reference to FIG. 1. In the illustrated embodiment, these connecting means 180, 182 take the form of laterally outwardly extending apertured ears or extensions. With reference to FIG. 12 it will be seen that the connectors 180 at one side of the carrier 140 preferably comprise single apertured extensions whereas the connectors 182 at the other side thereof comprise pairs of similar, spaced apart apertured ears. Hence, the latter paired connectors 182 interfit with the single ears 180' of a second similar conveyor structure 140'. In like fashion a second similar carrier structure 140" to the other side of the carrier 140 is provided with similarly outwardly extending apertured paired ears 182" for interfitting with the ears 180 of the carrier 140. In this regard, suitable pins or the like (not shown) may be inserted through the aligned apertures in the respective interfitted ears or extensions 180, 182" and 182, 180' to achieve their interconnection.

Referring now to FIGS. 14 through 22, the operation of the invention in forming a sausage will be briefly described. In FIGS. 14 through 22, inclusive, the cartridge or reusable casing assembly has been schematically illustrated in simplified form to facilitate description of the operation thereof.

Figure 14:
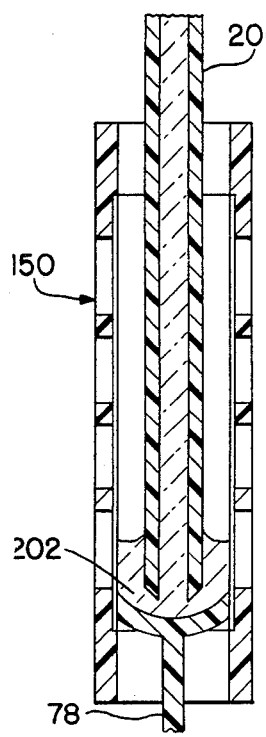
FIGS. 14 through 22 are simplified schematic diagrams illustrating a sequence of operation in accordance with the process of FIG. 1, using the apparatus in accordance with the invention.
Figure 15:
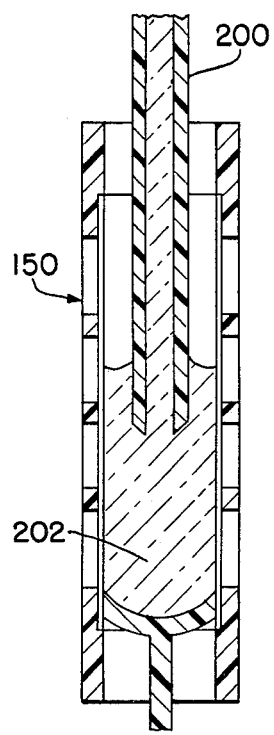
Figure 16:
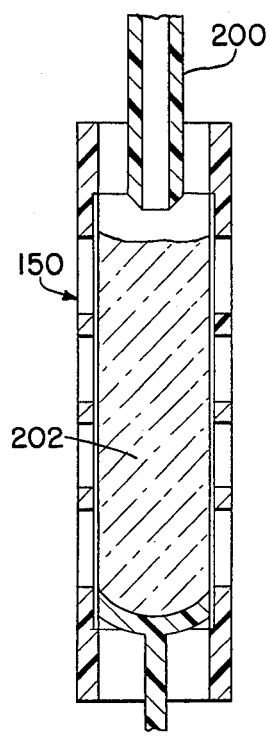
Figure 17:
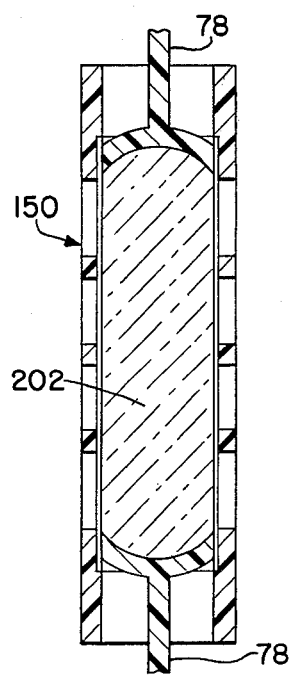

Initially, in FIG. 14, a cartridge 150 as previously described is provided with only one end cap, here schematically represented by the associated plunger or piston 78. The filling station 22 described with reference to FIG. 1 above includes a suitable tubular injection member 200 for filling the cartridge 150 with sausage material, preferably in the form of an emulsion 202. In FIGS. 15 and 16, this filling tube 200 is gradually withdrawn from the cartridge 150 as it is filled with the sausage emulsion 202. In FIG. 17, the cartridge 150, now filled with the desired amount of sausage emulsion 202, receives the opposite end cap, also schematically represented by the associated plunger or piston 78. The cartridge is then placed upon its associated carrier 140 (not shown in FIG. 17) of the type illustrated and described in FIGS. 11 through 13.

Figure 18:
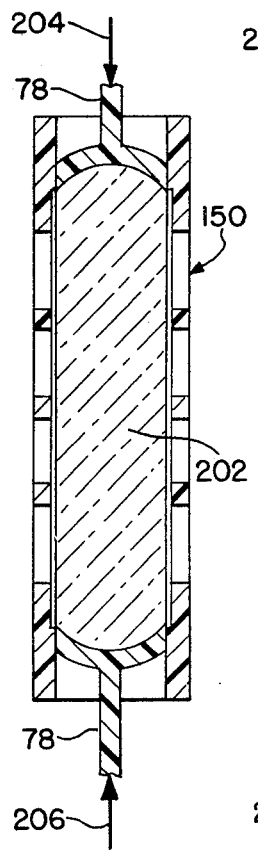

It will be remembered that pressure is applied by the spring loaded arrangement described in FIGS. 11 through 13 and this is schematically illustrated in FIG. 18 by arrows 204, 206. Also in FIG. 18 the expansion of the sausage material 202 during coagulation, reddening and initial cooking, as described with reference to elements 32 and 34 of FIG. 1, takes place.

Figure 19:
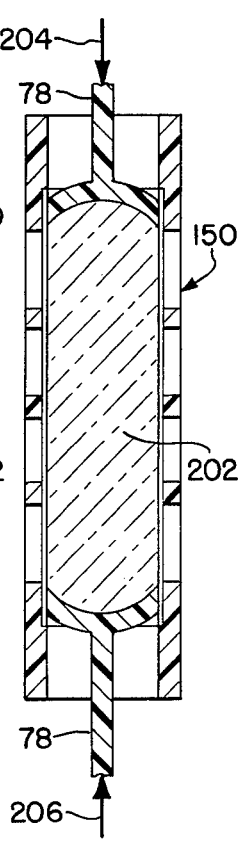
Figure 20:
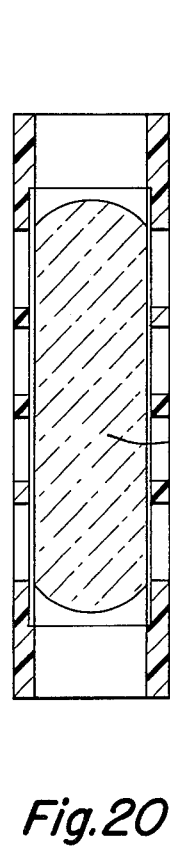

In FIG. 19, the continuing pressure of the spring loading arrangement illustrated diagrammatically by arrows 204 and 206 returns the sausage material 202 to substantially its initial volume during the cooling step previously described with reference to element 36 of FIG. 1. Thereafter, referring to FIG. 20, the end caps schematically represented by pistons 78 are removed.

Figure 21:
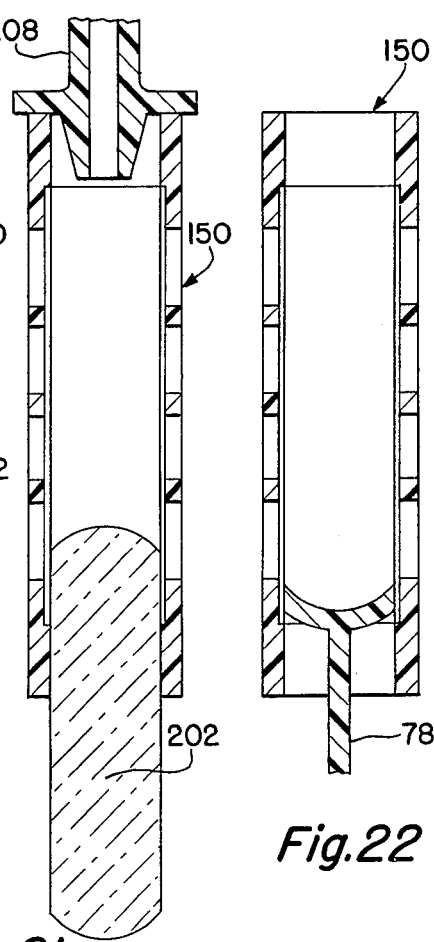
Figure 22:
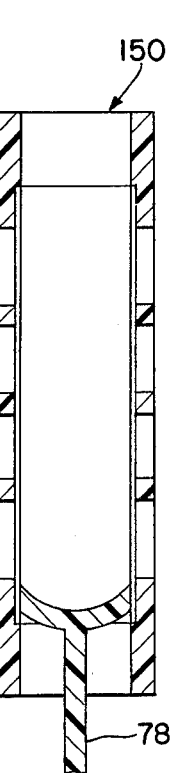

In FIG. 21, the coagulated and formed sausage 202 is ejected by means of a suitable pressurized air blast provided by suitable means diagrammatically illustrated at 208, which corresponds generally to the element 38 of FIG. 1. Thereafter, the cartridges and caps are cleaned by suitable means as diagrammatically illustrated at 50 in FIG. 1. Thereupon, the bottom capping machine 26 of FIG. 1 applies a cleaned piston 78 and its associated end cap to a cleaned cartridge or reusable casing for reuse as illustrated in FIG. 22.

While the invention has been illustrated and described hereinabove with reference to preferred embodiments, the invention is not limited thereto. Those skilled in the art may devise various alternatives, changes and modifications. The invention includes such alternatives, changes and modifications insofar as they fall within the spirit and scope of the appended claims.

The invention is claimed as follows:

1. A reusable tubular casing for use in producing sausage comprising: an elongate, tubular membrane; an elongate, tubular supporting layer in surrounding relation to said membrane through a substantial portion of its length; a rigid support structure supporting said membrane and said supporting layer to define a substantially smooth through bore extending from end to end of the elongate membrane; said tubular layer comprises a mesh-like tube of a continuous woven, seamless material.

2. A casing according to claim 1 wherein said tube further comprises a fabric woven from a monofilament yarn and having interstices of on the order of from substantially 30 micron to substantially 100 micron.

3. A carrier for releasably retaining a reusable casing member for use in the production of sausage, said casing member comprising an elongated tubular member and a pair of end caps slidably supporting axially movable piston means disposed within opposed ends of said tubular member, said carrier comprising: supporting body means, yoke means for receiving and locating said casing member relative to said body means, and force imposing means impinging on said piston means to maintain a predetermined force against sausage material carried within said tubular member, said yoke means comprises at least two axially spaced pairs of arms extending laterally from said body for embracing said tubular member at axially spaced locations respectively axially inwardly of said pair of end caps.

4. A carrier according to claim 3 wherein said force imposing means comprises a pair of axially spaced arms pivotally extending from said body in the same direction as said yoke means, each of said arms at their free ends engaging respective free outer ends of said piston means, and resilient means coupled with said arms for urging said arms respectively axially inwardly to bear against said piston means.

5. A carrier according to claim 4 wherein said resilient means comprises a pair of tension springs respectively coupled intermediate said body and said pivotally mounted arms for pivotally urging said arms inwardly to bear against said piston means.

6. A carrier according to claim 5 wherein said carrier means further includes coupling means for interconnecting a plurality of identical carrier means in series to define a conveyor-like assembly for conveying a plurality of identical casing members.

* * * * *